Nov. 20, 1923.   G. G. SCHONEBERGER   1,474,387
PNEUMATIC TIRE
Filed Dec. 1, 1922
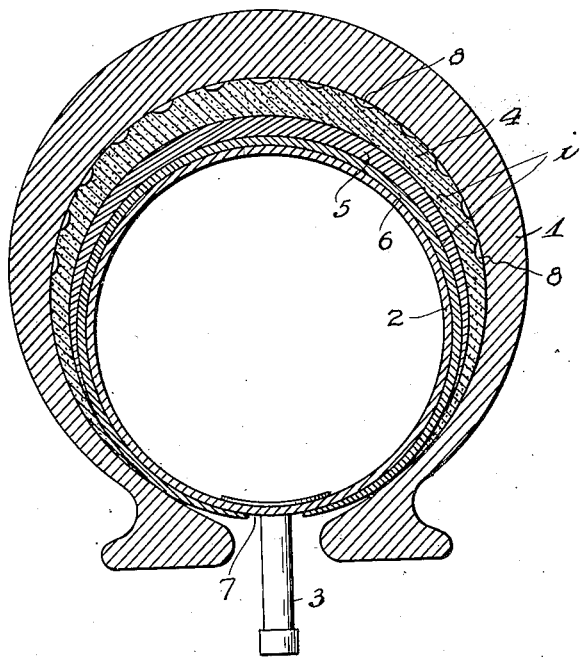
INVENTOR.
Gerhard G. Schoneberger
BY Charles J. Schmidt
ATTORNEYS.

Patented Nov. 20, 1923.

1,474,387

UNITED STATES PATENT OFFICE.

GERHARD G. SCHONEBERGER, OF OAK PARK, ILLINOIS.

PNEUMATIC TIRE.

Application filed December 1, 1922. Serial No. 604,381.

*To all whom it may concern:*

Be it known that I, GERHARD G. SCHONEBERGER, a citizen of the United States, and a resident of Oak Park, county of Cook, and State of Illinois, have invented certain new and useful Improvements in Pneumatic Tires, of which the following is a specification.

My invention relates to pneumatic tires, the object being to provide improved construction which will make the tire proof against punctures and blowouts and which will greatly increase the life of the outer casing.

In accordance with my invention I interpose cushioning and strengthening material between the compressed air space and the tread and sides of the outer casing in such manner as will provide a cushioning layer between the inner tube and the casing for increasing the cushioning properties of the tire as a whole, and also a protecting layer for preventing puncturing of the inner tube and for preventing blowouts.

On the accompanying drawing the various features of my invention are illustrated and on the drawing the figure is a cross sectional view of a tire.

The tire casing 1 shown is of the ordinary construction, and 2 represents the ordinary inner tube with its air nipple 3. In the ordinary arrangement the inner tube lies directly against the inner wall of the casing which is sometimes rough and has a tendency to chafe the inner tube during travel of the vehicle. Also, with this arrangement, when a particle penetrates the casing the inner tube is immediately punctured and if the casing is cut the inner tube will yield at that point and a blowout will result. To overcome these disadvantages I interpose what may be termed an intermediate tube structure designated as a whole by $i$. The intermediate tube shown comprises a crescent shaped outer layer 4 preferably of soft or sponge rubber, or rubber composition. Inside of this outer layer is the intermediate crescent shaped layer 5 of harder and tougher material such as hard rubber or fabric, or a combination of rubber and fabric. The inner layer 6 is of soft yieldable rubber and may be made of the same grade of rubber as that used for the ordinary inner tube. The various layers are vulcanized or otherwise secured intimately together and then form the crescent shape intermediate tube for insertion into the casing, the tube being provided at its inner side with the longitudinally extending opening 7 through which the regular inner tube 2 may be inserted. The intermediate tube $i$ is inserted in the outer casing 1 with its thicker part along the tread and with its thinner part along the sides of the casing. When the inner tube 2 is then inserted and inflated in the ordinary manner the intermediate tube will be firmly pressed against the inner side of the casing, and in order to increase the frictional engagement and prevent displacement of the inner tube I preferably provide vacuum depressions or pockets 8 in the outer face of the intermediate tube, these depressions or pockets causing the intermediate tube to obtain a firm grip on the casing so that displacement of the tube will be prevented.

With the arrangement above described the inner tube will be protected against puncture particularly by the strong and tough intermediate layer 6 of the intermediate tube, and also by the softer outer layer, this outer layer adding just that much distance for the travel of nails or glass or other material before the inner tube will be in danger of being punctured. I have found that after any such objects have penetrated through the outer casing and the outer layer 4 the tough intermediate layer 5 is almost certain to prevent further travel so that the inner tube will be prevented from being punctured.

Another advantage of the improved arrangement is that blowouts are less likely to occur for the reason that if the outer casing should be gashed or cut the intermediate tube will be between the gash and the intermediate tube will prevent the inner tube from being blown out.

Another advantage of the improved construction is that greater resiliency will be given to the tire structure as a whole particularly when traveling over objects like small stones, the abrupt shocks on the outer casing being communicated to and to a great extent absorbed by the cushioning material of the outer layer 4 of the intermediate tube.

Having described my invention, I claim as follows:

A protective insert for pneumatic tires comprising an inner tubular layer of pliable rubber slit longitudinally along its inner side to provide an opening for the insertion of an inflatable inner tube, said layer being of uniform thickness throughout, an intermediate layer of hard puncture resisting rubber extending along the tread and side portions and to within a short distance of the inner ends of said inner layer, and an outer layer of soft cushioning rubber extending along the tread and side portions to within a short distance of the inner ends of said inner layer, said intermediate and outer layers being of decreasing thickness from the tread portion to the ends of the side portions and all said layers being securely vulcanized together to form an insert of crescent shaped cross section.

In witness whereof, I hereunto subscribe my name this 25th day of November, A. D. 1922.

GERHARD G. SCHONEBERGER.